(12) United States Patent
Kramarz et al.

(10) Patent No.: US 6,303,098 B1
(45) Date of Patent: Oct. 16, 2001

(54) STEAM REFORMING CATALYST

(75) Inventors: Kurt W. Kramarz, Murrysville, PA (US); Ira D. Bloom, Bolingbrook, IL (US); Romesh Kumar, Naperville, IL (US); Shabbir Ahmed, Bolingbrook, IL (US); Rolf Wilkenhoener, Oakbrook Terrace, IL (US); Michael Krumpelt, Naperville, IL (US)

(73) Assignee: University of Chicago, Chicago, IL (US)

( * ) Notice: Subject to any disclaimer, the term of this patent is extended or adjusted under 35 U.S.C. 154(b) by 0 days.

(21) Appl. No.: 09/382,737

(22) Filed: Aug. 24, 1999

Related U.S. Application Data

(63) Continuation-in-part of application No. 09/029,190, filed on Jun. 8, 1998, now Pat. No. 5,929,286, and a continuation-in-part of application No. 08/867,556, filed on Jun. 2, 1997, now Pat. No. 6,110,861.

(51) Int. Cl.⁷ ....................................................... C01B 3/16
(52) U.S. Cl. ......................... 423/656; 252/373; 502/326; 568/383
(58) Field of Search ..................................... 502/326, 330, 502/333; 501/103, 126; 429/40; 568/383, 449; 549/512; 252/376, 373; 423/656

(56) References Cited

U.S. PATENT DOCUMENTS

| | | | | |
|---|---|---|---|---|
| 3,997,477 | * | 12/1976 | Takeuchi | 252/465 |
| 4,088,608 | * | 5/1978 | Tanaka et al. | 252/466 PT |
| 5,929,286 | * | 7/1999 | Krumpelt et al. | 568/383 |

* cited by examiner

*Primary Examiner*—Sreeni Padmanabhan
(74) *Attorney, Agent, or Firm*—Emrich & Dithmar

(57) ABSTRACT

A method of forming a hydrogen rich gas from a source of hydrocarbon fuel. A vapor of the hydrocarbon fuel and steam is brought in contact with a two-part catalyst having a dehydrogenation powder portion and an oxide-ion conducting powder portion at a temperature not less than about 770°C. for a time sufficient to generate the hydrogen rich. The $H_2$ content of the hydrogen gas is greater than about 70 percent by volume. The dehydrogenation portion of the catalyst includes a group VIII metal, and the oxide-ion conducting portion is selected from a ceramic oxide from the group crystallizing in the fluorite or perovskite structure and mixtures thereof. The oxide-ion conducting portion of the catalyst is a ceramic powder of one or more of $ZrO_2$, $CeO_2$, $Bi_2O_3$, $(BiVO)_4$, and $LaGaO_3$.

22 Claims, 2 Drawing Sheets

PRODUCT GAS COMPOSITION OBTAINED FROM THE STEAM REFORMING OF ISO-OCTANE IN THE PRESENCE OF A NOVEL CATALYST (R/CG=1%Ru/Ce$_{0.5}$Gd$_{0.5}$O$_{1.75}$)

STEAM REFORMING CATALYST

RELATED APPLICATIONS

This application is a continuation-in-part of U.S. Ser. No. 08/867,556 filed Jun. 2, 1997, now U.S. Pat. No. 6,110,861, which was also the parent of a continuation-in-part of application Ser. No. 09/092,190 filed Jun. 8, 1998, now U.S. Pat. No. 5,929,286.

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

TECHNICAL FIELD

This invention relates to steam reforming of hydrocarbons to produce a hydrogen-containing gas suitable as a fuel for a fuel cell.

BACKGROUND OF THE INVENTION

This is an improvement in the invention described in U.S. Pat. No. 5,248,566 issued Sep. 28, 1993, the disclosure of which is herein incorporated by reference and U.S. application Ser. No. 08/867,556 filed Jun. 2, 1997.

Fuel cells are being developed for use in both stationary form and in automotive propulsion systems as alternatives for the internal combustion engine in buses, vans, passenger cars and other vehicles. The major motivations for developing fuel cell powered vehicles are low pollution emissions, high fuel energy conversion efficiencies, superior acceleration, low noise and vibration and the possible use of coal or biomass derived alcohols rather than petroleum-base fuels. Although petroleum based fuels can also be used, the present invention is directed most specifically to systems for using hydrocarbons such as gasoline, diesel fuel or alcohols such as methanol as fuel.

The two most important operational requirements for a stand-alone fuel cell power system for a vehicle are the ability to start-up quickly and the ability to supply the necessary power and demand for the dynamically fluctuating load. The rapid start-up requirement is obvious.

A variety of hydrocarbons are possible fuels for use in transportation applications but most likely alcohols such as methanol are preferred fuels for use in fuel cells for transportation applications. Methanol is a commodity chemical that is manufactured from coal, natural gas and other feed stocks, while ethanol is often produced from grain. For use in a fuel cell, however, alcohols and hydrocarbons must first be converted (reformed) to a hydrogen rich gas mixture. The desired features for such a fuel reformer include rapid start-up, good dynamic response, fuel conversion, small size and weight, simple construction and operation and low cost.

Methanol has been used in steam reforming for providing a hydrogen rich gas stream for mobile combustion engines, see Koenig et al. U.S. Pat. No. 4,716,859, and water, as a reaction product from a fuel cell, has been recycled for use in steam reforming of methanol, see Baker U.S. Pat. No. 4,365,006. Steam reforming of methanol is endothermic and complicates, by its energy requirements, its use in a vehicle. Supplying the hydrogen rich gas on demand in an intermittent variable demanding environment is also a difficult requirement to meet and has been addressed by Ohsaki et al. U.S. Pat. No. 4,988,580 but this suggestion is not applicable to a small, mobile system. The catalytic exothermic partial oxidation-reforming of fuels to produce hydrogen-rich gas streams is known, see Rao U.S. Pat. No. 4,999,993. The use of a partial oxidation reformer had not been used in a vehicle to accomplish the purposes of this invention prior to the disclosure of the Kumar et al. '566 patent which is satisfactory for its intended purposes, but was based on theoretical considerations.

Converting hydrocarbon fuels to hydrogen can be done by steam reforming (reaction of the hydrocarbon with steam) or by partial oxidation (reaction with a substoichiometric amount of air). Steam reforming reactors are fairly bulky and are heat-transfer limited, while the partial oxidation reaction is more rapid and exothermic but less developed.

The parent of this application provided a catalyst for the exothermic partial oxidation reaction and was desirable since the endothermic steam reforming reaction required temperatures of about 1000° C. At lower temperatures, the reactors can be smaller, can be made from less expensive materials like steels which are easier to fabricate and the product gas contains higher concentrations of hydrogen and less carbon monoxide, which is desirable. However, an appropriate catalyst for the endothermic steam reforming reaction has heretofore not been available, while the parent to this application disclosed a catalyst suitable for exothermic partial oxidation reaction. This invention is based on the surprising discovery that catalysts that are effective for the conversion of a wide range of hydrocarbons, including aliphatic, aromatics and others to hydrogen in the exothermic partial oxidation reaction are also effective in the endothermic steam reforming reaction.

SUMMARY OF THE INVENTION

This invention relates to a steam reforming catalyst. More specifically, this invention relates to a catalyst for steam reforming hydrocarbon fuels such as gasoline or diesel fuel to produce a high percentage yield of hydrogen suitable for supplying a fuel cell. The difficulty of converting hydrocarbons (e.g. methane, iso-octane, hexadecane, toluene, etc.), a main component of natural gas, gasoline, and diesel to hydrogen is the fact that the hydrogen/oxygen bond is thermodynamically stronger than the carbon oxygen bond at moderate temperatures. Under thermal equilibrium conditions, the reaction products will therefore be rich in water and poor in hydrogen. In order to produce a hydrogen-rich gas, a bifunctional catalyst is required which can "dehydrogenate" the hydrocarbon molecule, and then selectively oxidize the carbon chain.

This invention relates to the development of a new class of materials that can be used for the steam reforming of hydrocarbons.

The steam reforming process involves the reaction of a hydrocarbon fuel with water (steam) to produce hydrogen and carbon dioxide as per the equation $C_nH_mO_p+(2n-p)H_2O = nCO_2+(2n-p+m/2)H_2$. The reaction is strongly endothermic, requiring a large amount of heat to be supplied. Steam reforming of natural gas is traditionally done in the petrochemical industry at temperatures in excess of 900° C. The new catalyst, which uses a combination of a metal and an oxide-ion conductor, can achieve the conversion of methane and other types of hydrocarbons at less than 800° C. The lower temperature operation is beneficial for a number of reasons which include: I) wider choice of materials of construction; ii) higher process efficiency, iii) lower yields of carbon monoxide—which must be subsequently converted to carbon dioxide and hydrogen via the water-gas shift reaction; (iv) faster start-up process—essential for applications involving frequent start-up of process—essential for applications involving frequent start/stop cycles as in transportation and in distributed power generation units; etc.

The catalyst of the invention is a cement containing curia as the oxide ion conduction material to convert the carbon to carbon oxides, and ruthenium or platinum as the hydrogen extracting material. The catalyst can be prepared from a high surface area powder of doped curia ($Ce_{1-x}Ln_xO_p$, or, $Ce_{1-x-y-z}Ln_xCs_yLi_zO_p$, where Ln-lanthanide, e.g. La, Sm, Gd, etc., and $x \leq 0.5$) and a second powder which could be either a metal (Pt) or a metal oxide which would get reduced in-situ in the reactor. Alternatively, catalyst materials can also be prepared from self-sustaining combustion syntheses.

Other metals include all noble and transition metals. Other oxide ion conducting materials include zirconia, bismuth oxides or vanadates, lanthanum gallate, perovskite containing manganese, cobalt, or others forming oxygen deficient structures.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

Figure 1:
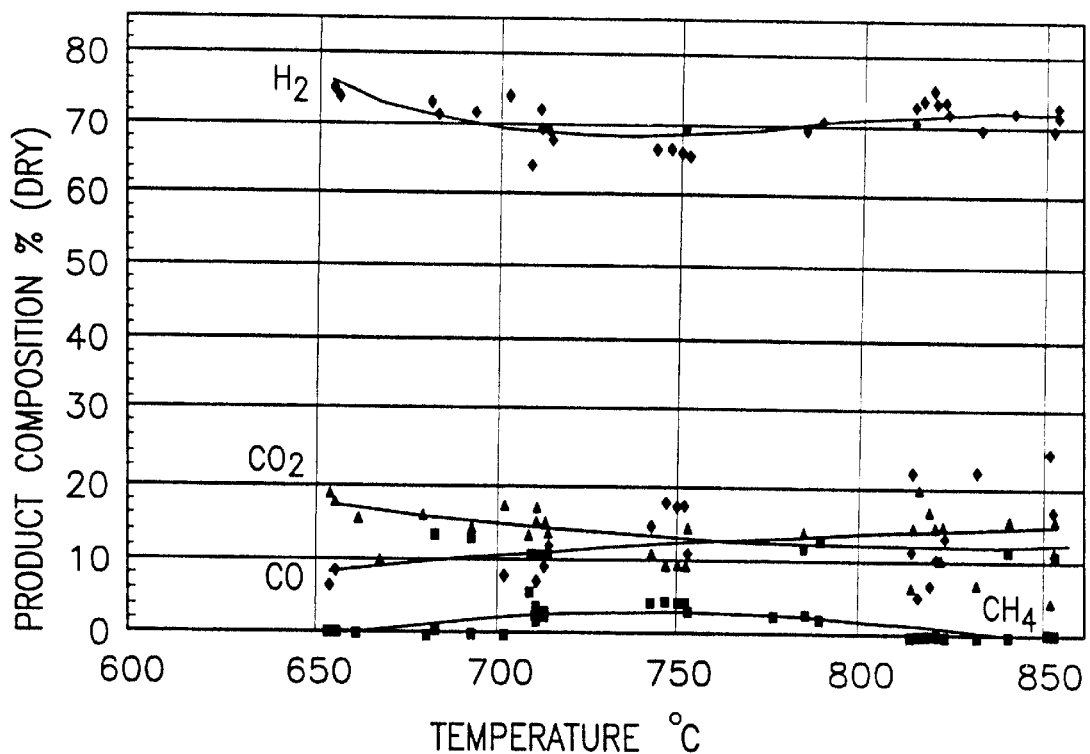
FIG. 1 is a graphical representation of the products obtained from the steam reforming of iso-octane at temperatures from about 650° C. to about 850° C.
Figure 2:
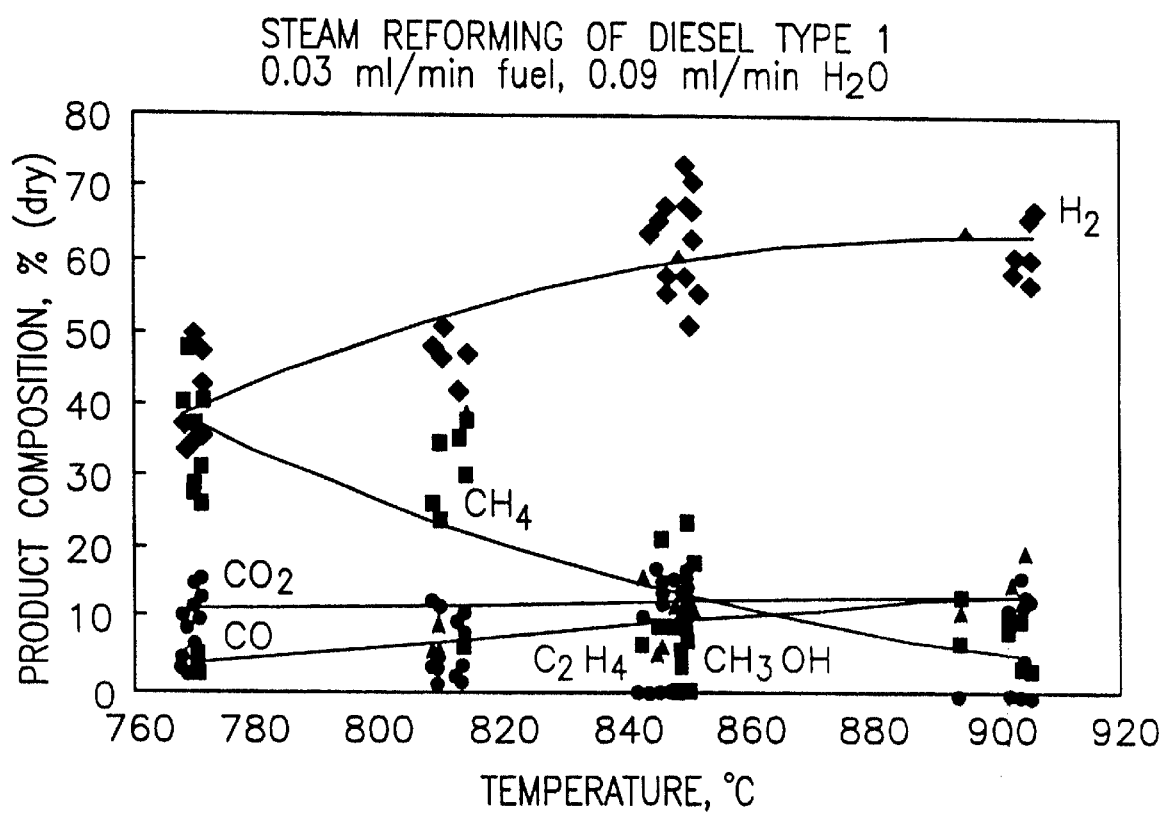
FIG. 2 is a graphical representation of the products obtained from the steam reforming of diesel fuel at temperatures from about 770° C. to about 900° C.

The parent of this application disclosed the inventive catalyst as being useful for the partial oxidation reaction for partially oxidizing the same type of feed stock in an exothermic reaction. That this same catalyst was also found to be exceptional in the highly endothermic steam reforming reaction was surprising because the thermodynamic requirements of the two reactions are opposite. That the catalyst of this invention also lowered the temperature at which the partial reforming reaction occured from about 1000° C. to less than 800° C. (over 20% improvement) was also highly unexpected. This fortuitous circumstance once again makes steam reforming an attractive alternative, where previously because of high temperatures and endothermic nature of the reaction, steam reforming was not considered a viable process for fuel cells in automotive propulsion. The steam reforming process at these lower temperatures also become more attractive for small, distributed fuel cell power systems for stationary applications.

In one aspect of the invention, the catalyst is a cermet containing powder curia as the oxide ion conduction material, and powder platinum as the hydrogen dissolving material. The catalyst can be prepared from a high surface area powder of doped curia ($Ce_{0.8}Gd_{0.2}O_{1.9}$) and a second phase powder which could be either a metal like platinum or an oxide metal complex or metal oxide like $Co_2O_3$ which is reduced in-situ in the reactor to cobalt metal powder. Other metals include all noble and transition metals. Other oxide ion conducting materials based on materials such as doped or undoped zirconia, bismuth oxides or vanadates, ($La_{1-w}M_w)_xGa_{1-y}Mg_yO_z$ where M is a group II metal and W is between 0 and 0.5, and x is between 0.7 and 1, and Y is between 0 and 0.3 and Z is between 2.225 and 3; perovskite containing manganese, iron, cobalt, or nickel, vanadium, chromium or others forming oxygen deficient structures are applicable.

In another aspect of the invention, various alkanes can be oxidized by contact with the catalyst of the present invention to form alkene oxides, ketones or aldehydes.

The difficulty of converting hydrocarbons such as methane, octane, hexadecane and other components of natural gas, gasoline and diesel to hydrogen is the fact that the hydrogen/oxygen bond is thermodynamically stronger than the carbon oxygen bond at moderate temperatures. Under thermal equilibrium conditions, the reaction product will therefore be rich in water and poor in hydrogen. We discovered that in order to get a hydrogen-rich gas one would have to find a catalyst that can "dehydrogenate" the hydrocarbon molecule, and then selectively oxidize the carbon chain. Thus, the catalyst must be bifunctional.

The steam reforming process involves the reaction of a hydrocarbon with water (steam) to produce hydrogen, carbon monoxide, and carbon dioxide as per the unbalanced equation

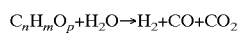

$$C_nH_mO_p + H_2O \rightarrow H_2 + CO + CO_2$$

The reaction is strongly endothermic, requiring a large amount of heat to be supplied. Steam reforming of natural gas is traditionally done in the petrochemical industry at high pressures and temperatures in excess of 900° C. The new catalyst, which uses a combination of a metal and an oxide-ion conductor, can achieve the conversion of methane and other types of hydrocarbons at less than 800° C. The lower temperature operation is beneficial for a number of reasons which include: (i) wider choice of materials of construction, (ii) higher process efficiency, (iii) lower yields of carbon monoxide—which must be consequently converted to carbon dioxide and hydrogen via the water-gas shift reaction, and (iv) faster start-up of process—essential for applications involving frequent start/stop cycles as in transportation and in distributed power generation units etc.

The catalyst of the invention is a cermet containing doped curia as the oxide ion conduction material to convert the carbon to carbon oxides, and ruthenium or platinum as the hydrogen extracting material. The catalyst can be prepared from a high surface area powder of doped ceria ($Ce_{1-x}Ln_xO_p$ or $Ce_{1-x-y-z}Ln_xCs_yLi_zO_p$ where Ln=lanthanide, e.g., La, Sm, Gd, etc., and $x \leq 0.5$) and a second powder that could be either a metal, such as (Pt) or a metal compound or complex oxide that would get reduced in-situ in the reactor. Alternatively, catalyst materials can also be prepared from self-sustaining combustion syntheses, or sol-gel processes, precipitation processes, hydrothermal syntheses, gas-phase reaction or other chemical syntheses processes.

Other metals include all noble and transition metals. Other oxide ion conducting materials include zirconia, bismuth oxides or vanadates, lanthanum gallate, perovskites containing manganese, cobalt, iron, nickel, vanadium, chromium or others forming oxygen deficient structures.

The catalyst has been tested and shown to steam reform natural gas to produce 75% (dry basis) hydrogen at temperatures below 800° C. (Table 1). The natural gas was mised with vaporized water (liquid flow rate 0.04 ml/min) and passed over 2 g of the catalyst.

TABLE 1

Product gas composition obtained from the steam reforming of natural gas in the presence of the novel catalyst (P/CSCL) = 0.5% Pt/Ce$_{0.75}$Sm$_{0.234}$Cs$_{0.015}$Li$_{0.001}$O$_{1.859}$).
NG = 16.5 ml/min Water = 0.04 ml/min, Cat. Wt. - 2 g

| Temperature ° C. | H2 % (dry) | CH4 % (dry) | CO % (dry) | CO2 % (dry) |
|---|---|---|---|---|
| 773 | 75.82 | 1.53 | 16.95 | 5.69 |
| 776 | 75.65 | 4.24 | 11.53 | 8.57 |
| 777 | 75.28 | 1.47 | 15.87 | 7.38 |
| 779 | 76.16 | 1.69 | 15.71 | 6.45 |
| 787 | 76.60 | 0.64 | 16.16 | 6.60 |
| 787 | 76.35 | 1.42 | 13.87 | 8.36 |
| 787 | 76.96 | 0.81 | 15.79 | 6.43 |
| 786 | 76.33 | 0.97 | 15.09 | 7.62 |
| 786 | 75.61 | 1.00 | 17.06 | 6.34 |
| 786 | 76.68 | 1.13 | 15.88 | 6.31 |
| 786 | 76.24 | 0.82 | 16.60 | 6.34 |
| 787 | 77.11 | 0.94 | 15.29 | 6.66 |
| 790 | 75.98 | 0.75 | 19.46 | 3.81 |
| 789 | 74.48 | 0.99 | 22.26 | 2.26 |
| 788 | 75.85 | 0.70 | 21.00 | 2.45 |
| 787 | 74.76 | 1.02 | 21.84 | 2.38 |
| 785 | 75.28 | 0.92 | 21.46 | 2.35 |

A similar catalyst was also found to steam reform iso-octane (the principal of gasoline) to produce H$_2$ in excess of 72% (dry basis) as shown in FIG. 1. The results were obtained by vaporizing 0.02 ml/min of iso-octane and 0.05 ml/min passing the mixture over 2 g of the catalyst in the heated reactor.

To dehydrogenate a hydrocarbon molecule, one can use metals that dissolve or absorb hydrogen such as platinum, nickel or any Group VIII metal or alloys of one or more of the metals. To selectively oxidize the carbon chain, we found that one is able to use a source of ionic oxygen. Ionic oxygen apparently reacts with the double bonds of a dehydrogenated hydrocarbon to form oxygen carbon bonds. Sources of ionic oxygen are oxides crystallizing in the fluorite or perovskite structure, such as for instance by way of example without limitation, $ZrO_2$, $CeO_2$, $Bi_2O_3$, $BiVO_4$, $LaGaO_3$. By combining such oxides with a hydrogen dissolving metal and passing a hydrocarbon/air mixture over it, we discovered it is possible to obtain hydrogen-rich gas from different types of hydrocarbons, such as aliphatic, aromatic, napthenes, olefins, alcohols, oxygenates and others.

We chose for purposes of examples, only, ceria as the oxide ion conducting material, and platinum or ruthenium as the hydrogen dissolving metal. A cermet containing the catalysts were prepared by a solid state method. The starting powders were a high surface area (about 32 m$^2$/gm) doped ceria (Ce$_{0.8}$Gd$_{0.2}$O$_{1.9}$) and a second phase. By high surface area, we mean powders having surface areas greater than 1 m$^2$/gm. The starting second phase powder was either a metal like Pt or an oxide like Co$_2$O$_3$ which is reduced in-situ in the reactor to cobalt metal.

The two powders were mixed in the desired ratios of 1% by weight Pt or Ru metal and 99% by weight ceramic along with some isopropyl alcohol and up to 5 wt % of a dispersing agent for the second phase (oleic acid for metals and Hypermer Kd2 from ICI Americas Inc. for oxides) and then milled vigorously in a high density polyethylene bottle with ZrO$_2$ milling media. The mixture was then dried to remove the alcohol while stirring on a hot plate to about 70° C., pressed into 1.125–1.5" pellets with about 3 gms of powder using 10,000 to 12,000 lbs. load and fired at 1000° C. for 15–60 mins. in air. The resulting pellet had a uniform pore structure to allow gas access. In general, the metal content may be in the range of from about 0.1% to about 10% by weigh. About 1% by weight is preferred.

Referring to 2 which shows that the Argonne steam reforming catalyst (0.5 wt. % Pt on Ce$_{0.75}$Sm$_{0.234}$Cs$_{0.015}$O1$_{0.859}$ Figure) can steam reform diesel fuels at temperatures less than 950° C. The experiments were conducted by passing a mixture of diesel (Type I) fuel and water over 2-g of catalyst in a ½-in diameter reactor tube. The catalyst was maintained at the desired temperature by placing the reactor tube inside a tube furnace. The feed rates for the liquid diesel fuel and the liquid water were 0.03 and 0.09 ml/min, respectively. The gas hourly space velocity (GHSV) based on the reactants (gas at 25° C.) was 3700 per hour.

Other acceptable oxygen ion conducting oxides are CeO$_2$ doped catalyst Ce$_{0.5}$Gd$_{052}$O$_{1.9}$, Ce$_{0.75}$SM$_{0.234}$O$_{1.859}$; Ce$_{0.75}$Sm$_{0.234}$Cs$_{0.015}$Li$_{0.001}$O$_{1.8959}$; Ce$_{0.5}$Gd$_{0.5}$O$_{1.75}$; Ce$_{1-x}$Ln$_x$O$_p$; where Ln is a rare earth and X is between 0 and $_{0.5}$ and p is between $_{0.92}$ and about $_2$; Ce$_{1-x-y-z}$Ln$_x$Cs$_y$Li$_z$O$_p$, where Ln is a rare earth and x is between 0 and about 0.5 and y is between 0 and about 0.05 and Z is between 0 and about 0.01 and p is between 0.92 and about 2.

While there has been disclosed what is considered to be the preferred embodiment of the present invention, it is understood that various changes in the details may be made without departing from the spirit, or sacrificing any of the advantages of the present invention.

What is claimed is:

1. A method of forming a hydrogen rich gas from a source of hydrocarbon fuel, comprising contacting a vapor of the hydrocarbon fuel and steam with a two-part catalyst comprising a dehydrogenation compound portion and an oxide-ion conducting powder portion at a temperature not less than about 770° C. for a time sufficient to generate the hydrogen rich gas wherein the H$_2$ content is greater than about 70 percent by volume.

2. The method of claim 1, wherein the hydrocarbon fuel is natural gas.

3. The method of claim 1, wherein the hydrocarbon fuel is gasoline.

4. The method of claim 1, wherein the hydrocarbon fuel includes alkanes.

5. The method of claim 1, wherein the hydrocarbon fuel also includes aromatics.

6. The method of claim 1, wherein the hydrocarbon fuel includes branched alkanes and alkenes.

7. The method of claim 2, wherein the dehydrogenation portion includes a group VIII metal, and the oxide-ion conducting portion is selected from a ceramic oxide from the group crystallizing in the fluorite or perovskite structure and mixtures thereof.

8. The method of claim 2, wherein said oxide-ion conducting portion is a ceramic powder of one or more of ZrO$_2$, CeO$_2$, Bi$_2$O$_3$, (BiVO)$_4$, and LaGaO$_3$.

9. The method of claim 8, wherein the ceramic oxide powder is doped with a rare earth metal.

10. The method of claim 9, wherein the rare earth metal doped ceramic powder is also doped with an alkali metal or an alkaline earth metal.

11. The method of claim 1, wherein the dehydrogenation compound portion is a powder of a group VIII metal.

12. The method of claim 11, wherein the group VIII metal is Pt and the oxide-ion conducting portion includes CeO$_2$ powder.

13. The method of claim 12, wherein the CeO$_2$ powder is doped with a rare earth metal.

14. The method of claim 13, wherein the powder CeO$_2$ doped catalyst is Ce$_{0.5}$Gd$_{052}$O$_{1.9}$.

15. The method of claim 14, wherein the powder $CeO_2$ doped catalyst is $Ce_{0.75}SM_{0.234}O_{1.859}$.

16. The method of claim 13, wherein the powder $CeO_2$ doped catalyst is $Ce_{0.75}Sm_{0.234}Cs_{0.015}Li_{0.001}O_{1.8959}$.

17. The method of claim 1, wherein the group VIII metal compound is Pt, Pd, Ru or mixtures thereof.

18. The method of claim 1, wherein the oxide-ion conducting portion includes a ceramic powder including one or more of $ZrO_2$, $CeO_2$, $Bi_2O_3$(V+Bi)$_2O_3$ and $LaGaO_3$.

19. The method of claim 1, wherein the powder $CeO_2$ doped catalyst is $Ce_{0.5}Gd_{0.5}O_{1.75}$.

20. The method of claim 1, wherein the catalyst has Pt, Pd, Ru or mixtures thereof present in an amount up to about 1 percent by weight.

21. The method of claim 20, wherein the two part catalyst has an oxide-ion conducting portion comprising $Ce_{1-x}Ln_xO_p$, where Ln is a rare earth and X is between O and 0.5 and p is between 0.92 and about 2.

22. The method of claim 20, wherein the two part catalyst has an oxide-ion conducting portion comprising $Ce_{1-x-y-z}Ln_xCs_yLi_2O_p$, where Ln is a rare earth and x is between 0 and about 0.5 and y is between 0 and about 0.05 and Z is between 0 and about 0.01 and p is between 0.92 and about 2.

* * * * *

UNITED STATES PATENT AND TRADEMARK OFFICE
CERTIFICATE OF CORRECTION

PATENT NO.     : 6,303,098 B1                                          Page 1 of 1
DATED          : October 16, 2001
INVENTOR(S)    : Kurt W. Kramarz et al.

It is certified that error appears in the above-identified patent and that said Letters Patent is hereby corrected as shown below:

Column 6,
Line 67, delete "Ceo$_{0.5}$" and insert -- Ce$_{0.5}$ --; delete "Gd$_{052}$" and insert -- Gd$_{0.52}$ --.

Column 7,
Line 2, delete "SM" and insert -- Sm --.

Signed and Sealed this

Fourth Day of June, 2002

Attest:

Attesting Officer

JAMES E. ROGAN
Director of the United States Patent and Trademark Office